United States Patent
Lobinger et al.

(10) Patent No.: US 7,346,835 B1
(45) Date of Patent: Mar. 18, 2008

(54) METHOD FOR ADAPTING OF THE DATA RATE IN A COMMUNICATIONS APPARATUS, AND A CORRESPONDING COMMUNICATIONS APPARATUS

(75) Inventors: Andreas Lobinger, Miesbach (DE); Juergen Michel, Munich (DE); Bernhard Raaf, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 854 days.

(21) Appl. No.: 10/130,929

(22) PCT Filed: Nov. 22, 2000

(86) PCT No.: PCT/DE00/04123

§ 371 (c)(1),
(2), (4) Date: May 22, 2002

(87) PCT Pub. No.: WO01/39421

PCT Pub. Date: May 31, 2001

(30) Foreign Application Priority Data

Nov. 25, 1999  (DE) .................... 199 56 748
Feb. 22, 2000  (DE) .................... 100 08 056
Mar. 29, 2000  (DE) .................... 100 15 685

(51) Int. Cl.
  *H03M 13/03* (2006.01)
(52) U.S. Cl. ................ 714/790; 714/774
(58) Field of Classification Search ......... 714/790, 714/755, 746, 774; 455/522; 375/377, 295; 370/335, 331
See application file for complete search history.

(56) References Cited

U.S. PATENT DOCUMENTS

| | | | | |
|---|---|---|---|---|
| 4,939,734 A * | 7/1990 | Heichler | ............. | 714/790 |
| 5,416,787 A * | 5/1995 | Kodama et al. | ........ | 714/790 |
| 5,983,384 A * | 11/1999 | Ross | .............. | 714/755 |
| 6,014,411 A * | 1/2000 | Wang | ............. | 375/259 |
| 6,094,427 A * | 7/2000 | Yi | .............. | 370/331 |
| 6,529,561 B2 * | 3/2003 | Sipola | ............ | 375/295 |
| 6,529,572 B1 * | 3/2003 | Rasanen | ......... | 375/377 |
| 6,621,873 B1 * | 9/2003 | Lee et al. | ........ | 375/295 |
| 6,665,833 B1 * | 12/2003 | Tong et al. | ....... | 714/790 |
| 6,732,326 B2 * | 5/2004 | Choi et al. | ........ | 714/790 |
| 6,782,271 B2 * | 8/2004 | Huh et al. | ......... | 455/522 |

FOREIGN PATENT DOCUMENTS

WO  WO 01/26273  4/2001

* cited by examiner

*Primary Examiner*—Guy Lamarre
*Assistant Examiner*—Mujtaba K. Chaudry
(74) *Attorney, Agent, or Firm*—Bell, Boyd & Lloyd LLP (57) ABSTRACT

A method for adapting the data rate in a communication apparatus as provided, wherein the individual data blocks in a data stream are punctured in accordance with a specific puncturing pattern for adaptation of the data rate, with the puncturing pattern being designed such that it is has a puncturing rate which increase continuously from a central region of the individual data blocks toward at one end of the individual data blocks.

36 Claims, 4 Drawing Sheets

FIG 2

|    | Pattern start                  | Pattern center | Pattern end                     |
|----|--------------------------------|----------------|---------------------------------|
| A  | 10101101101110110111101110     | ...11111...    | 01110111011101101110110101      |
| B  | 01011011011101101110110        | ...11111...    | 01110111011101101101010         |
| C  | 00101010110110                 | ...11111...    | 01101101010100                  |
| C1 | 000..............0000          | ...11111...    | 000..............0000           |
| C2 | 00000000                       | ...11111...    | 00000000                        |

|   | Pattern start | Pattern center | Pattern end |
|---|---|---|---|
| D | 1101011100 | ...11111... | 01001101 |
| E | 1101011010 | ...11111... | 01001101 |
| F | 1101001110 | ...11111... | 01001101 |
| G | 1101011100 | ...11111... | 01001110 |
| H | 1101011010 | ...11111... | 01001110 |
| I | 1101001110 | ...11111... | 01001110 |
| J | 01010110 | ...11111... | 01101010 |
| K | 10101110110 | ...11111... | 01101110101 |

FIG 5

| 0 | 1 | 2 | 3 |
|---|---|---|---|
| 4 | 5 | 6 | 7 |
| 8 | 9 | 10 | 11 |
| ... | ... | ... | ... |
| ... | ... | ... | ... |
| 40 | 41 | 42 | 43 |
| 44 | 45 | 46 | 47 |
| 48 | 49 | 50 | 51 |

METHOD FOR ADAPTING OF THE DATA RATE IN A COMMUNICATIONS APPARATUS, AND A CORRESPONDING COMMUNICATIONS APPARATUS

BACKGROUND OF THE INVENTION

Mobile radio technology is subject to rapid development. At the moment, work is being carried out on the standardization of the so-called UMTS mobile radio standard ("Universal Mobile Telecommunications System") for the third generation of mobile radios. According to the current state of UMTS standardization, the intention is to subject data to be transmitted via a radio-frequency channel to channel coding, with convolutional codes being used, in particular, for this purpose. The channel coding process results in the data to be transmitted being coded in a redundant manner, thus making it possible to recover the transmitted data more reliably at the receiver end. The code which is in each case used for the channel coding is characterized by its code rate r=k/n, where k denotes the number of data or message bits to be transmitted, and n denotes the number of bits which are present after the coding process. The lower the coding rate, the more powerful the code generally is. One problem which is associated with the coding process is, however, that the data rate is reduced by the factor r.

In order to match the data rate of the coded data stream to the respectively possible transmission rate, rate matching is carried out in the transmitter, in which process bits are either removed from the data stream, or are duplicated in the data stream, in accordance with a specific pattern. The removal of bits is referred to as a "puncturing", and the duplicating of bits is referred to as "repetition".

According to the current state of UMTS standardization, it is being proposed that a rate matching algorithm will be used which carries out puncturing using an approximately regular puncturing pattern; that is to say, the bits to be punctured are distributed equidistantly over the coded data block which is in each case to be punctured.

Furthermore, it is known that the bit error rate (BER) at the edge of a correspondingly coded data block decreases during the convolutional coding process. It is likewise known that the bit error rate can be changed locally within a data block by irregularly distributed puncturing. This knowledge has been used to find heuristically a puncturing pattern after whose use all the bits in the punctured data block will have a bit error rate corresponding to their respective importance. However, a procedure such as this is not practicable for UMTS mobile radio systems since a generally applicable algorithm is required here, which gives the desired results for any number of bits in a data block to be punctured, for any puncturing rate.

The present invention is, thus, directed toward a method for adapting the data rate of a data stream in a communications apparatus, as well as a corresponding communications apparatus, which leads to a satisfactory bit error rate and, in particular, can be used in mobile radio systems which use convolutional coding.

SUMMARY OF THE INVENTION

According to the present invention, therefore, the individual data blocks in the data stream are punctured in accordance with a specific puncturing pattern for adaptation of the data rate, with the puncturing pattern being designed such that it has a puncturing rate which increases continuously from a central region of the individual data blocks toward at least one end of the individual data blocks.

The puncturing pattern preferably has a puncturing rate which increases continuously from the central region toward both ends of the respective data block. As such, the bits at the start and at the end of the respective data block to be punctured are punctured to a greater extent, with this not being done using a uniform puncturing rate, but with a puncturing rate which rises continuously toward both ends of the respective data block; that is to say, the interval between the punctured bits becomes ever shorter toward the two ends of the data block.

For the purposes of the present application, the expression "continuously increasing puncturing rate" also refers to the interval, averaged over a specific number of successive bits, between punctured bits decreasing monotonally. The "specific number" may, in this case, be defined, for example, by the quotient of the constraint length of the code and of the code rate, since the region of coded bits which depend on one bit that is to be transmitted contains this "specific number" of bits. Thus, for example, the value 27 is obtained for a code with a constraint length 9 and a code rate 1/3 for the "specific number" of bits over which the averaged interval between punctured bits can be determined. If the code rate is 1/2, the "specific number" is 18.

This puncturing leads to the individual bits having an error rate which is more uniformly distributed over the punctured data block and, furthermore, results in a reduced overall error probability.

These advantages are maintained even if the data blocks are first of all punctured as described and are then once again subjected to a puncturing process with a uniform puncturing pattern. A repetition process likewise can be carried out following the puncturing process described above. In this way, the desired data rate, that is to say the desired number of bits to be transmitted in each data block, can be obtained very easily via two successive operations; namely, by puncturing with a fixed puncturing pattern, whose puncturing rate increases continuously toward both ends of the respective data block, and a subsequent further puncturing or repetition process.

The present invention is particularly suitable for adaptation of the data rate of a convolutional-coded data stream and can be used in a preferred manner in UMTS mobile radio systems, with this relating both to the area of the mobile radio transmitter and to that of the mobile radio receiver. However, the present invention is not restricted to this application field, but may be used in general wherever the data rate of a data stream needs to be adapted.

Additional features and advantages of the present invention are described in, and will be apparent from, the following detailed description of the invention and the Figures.

DETAILED DESCRIPTION OF THE INVENTION

Figure 1:
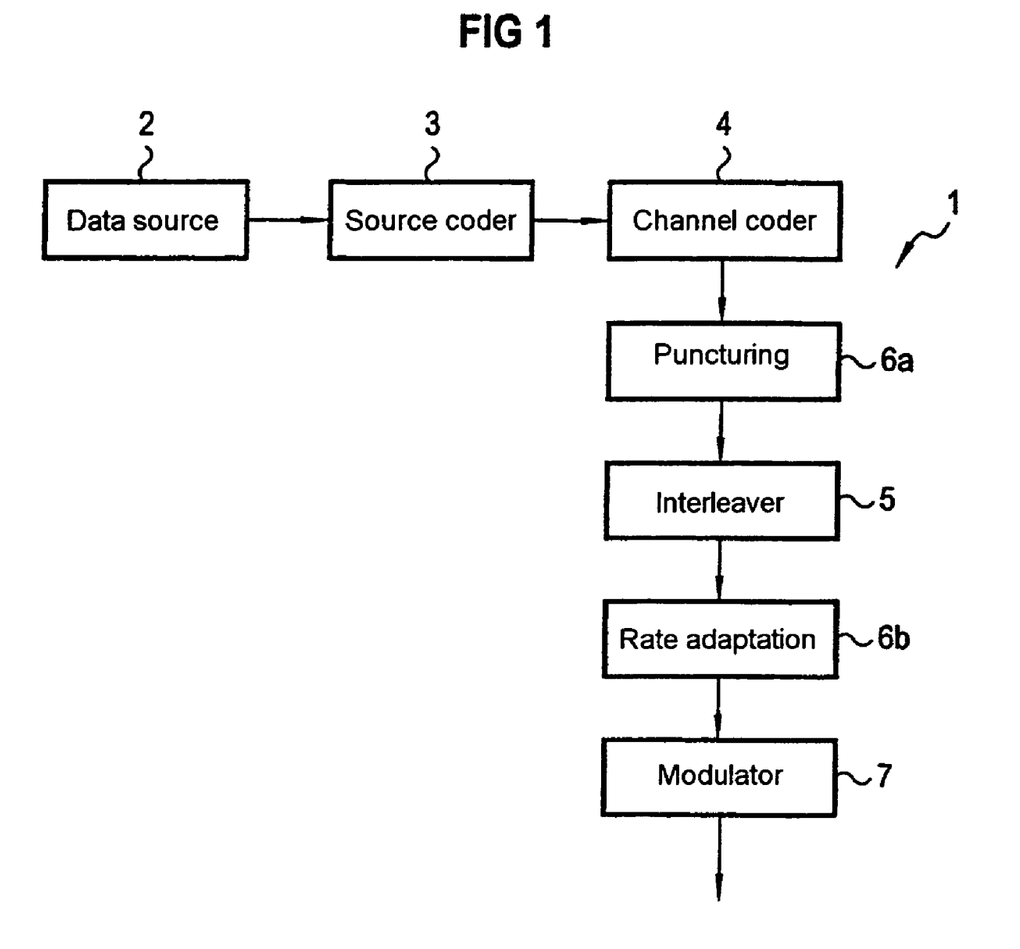
FIG. 1 shows a simplified block diagram of a mobile radio transmitter according to the present invention.

FIG. 1 shows, schematically, the design of a mobile radio transmitter 1 according to the present invention, from which data or communication information, in particular speech information, is transmitted via a radio-frequency transmission channel to a receiver. FIG. 1 shows, in particular, those components which are involved in the coding of this information or data. The information which is supplied from a data source 2, for example a microphone, is first of all converted to a bit sequence using a digital source coder 2. The speech-coded data is then coded via a channel coder 4, with the actual payload bits or message bits being coded in a redundant manner, so that it is possible to identify, and subsequently correct, transmission errors. The code rate r which results from the channel coding process is an important parameter for describing the code which is, in each case, used for the channel coding process and, as has already been mentioned, is defined by the expression r=k/n. In this case, k denotes the number of data bits and n denotes the number of coded bits overall; that is to say, the number of added redundant bits corresponds to the expression n−k. A code with the code rate r defined above is also referred to as an (n,k) code, with the performance of the code increasing as the code rate r decreases. So-called block codes or convolutional codes are normally used for channel coding.

In the following text, it is assumed that—(as is defined by the current standard of UMTS standardization) convolutional codes are used for channel coding. One major difference from block codes is that, in the case of convolutional codes, individual data blocks are not coded successively, with continuous processing being used instead, and with each particular code word in an input sequence to be coded depending on the preceding input sequences. Irrespective of the code rate r=k/n, convolutional codes are also characterized by the so-called constraint length K. The constraint length indicates the number of clock cycles of k new input bits to the convolutional coder 5 over which one bit influences the code word which is emitted from the convolutional coder 5.

Before the channel-coded information is transmitted to the receiver, it can be supplied to an interleaver 5 which reorganizes the bits to be transmitted in time in accordance with a specific scheme, and in the process spreads them in time, as a result of which the errors which generally occur in groups are distributed in order to produce a so-called memoryless transmission channel with a quasi-random error distribution. The information or data coded in this way is supplied to a modulator 7, whose object is to modulate the data onto a carrier signal and to transmit it via a radio-frequency transmission channel 3 to a receiver using a predetermined multiple access method.

For transmission, the coded data stream is subdivided into data blocks, with the convolutional coder 4 being set to a known state at the start of a data block. At the end, each coded data block is terminated by so-called tail bits so that the convolutional coder 4 is once again in a known state. This configuration of the convolutional code and of the convolutional coder 4 allows the bits at the start and end of a coded data block to be better protected against transmission errors than those in the block center.

The error probability of a bit differs depending on its position within the respective data block. This effect is utilized, for example in the case of speech transmission in GSM mobile radio systems, by placing the most important bits at the two block ends, where the error probability is at its lowest. However, during data transmissions, data packets are generally rejected even if only a single transmitted bit is incorrect, as can be detected, for example, in the receiver via a so-called cyclic redundancy check (CRC). Thus, for data transmission purposes, it is impossible to speak of important or less important bits, since all bits must be regarded as being equally important.

In order to match the data rate of the coded data stream to the respective possible transmission rate, rate matching is carried out upstream of the modulator 7. In the exemplary embodiment shown in FIG. 1, the rate matching process is split between two units 6a and 6b, with the unit 6a carrying our puncturing in accordance with a specific puncturing pattern, in order to achieve a more uniform error distribution across a data block. Following this, the optional unit 6b, if used, carries out further puncturing or repetition in order in the end to obtain the desired data rate. The sequence of the units 6a and 6b and of the interleaver 5 shown in FIG. 1 should be regarded as being only by way of example. The interleaver also may be arranged downstream from the unit 6b. The interleaver 5 likewise may be replaced by two interleavers upstream of and downstream from the unit 6b, etc.

The present invention is based on the principle of puncturing those coded data blocks which are at the start and/or at the end of the respective data block to a greater extent during the rate matching process. This is done using a puncturing rate which decreases from the edge to the center of the respective data block, that is to say, in a data block which is emitted from the unit 6a, the interval between successive puncturings is shortest at the start and at the end of the respective data block, and becomes ever greater toward the center.

Various embodiments are feasible for the puncturing patterns used by the unit 6a. In the simplest case, the puncturing of each data block is always carried out using the same pattern. However, it is also possible to use a different puncturing pattern depending on the length of the respective data block to be punctured. This procedure is particularly advantageous in the case of short data blocks since, in this case, the predetermined puncturing pattern can be shortened in order to avoid those sections of the puncturing pattern which are provided for the block start and the block end overlapping or merging with one another, as could otherwise occur if severe puncturing were carried out in the central region of the data block n*(K−1) tail bits are inserted into a coded data block when using a convolutional code with a code rate of r=/n and a constraint length of K. The puncturing pattern used by the rate matching unit 6 should, in this case be designed such that less than n*(K−1) bits are punctured in total at the start and end of the data block to be punctured. This can be achieved by puncturing less than n*(K−1)/2 bits in each case at the start and at the end of the data block.

Figure 2:
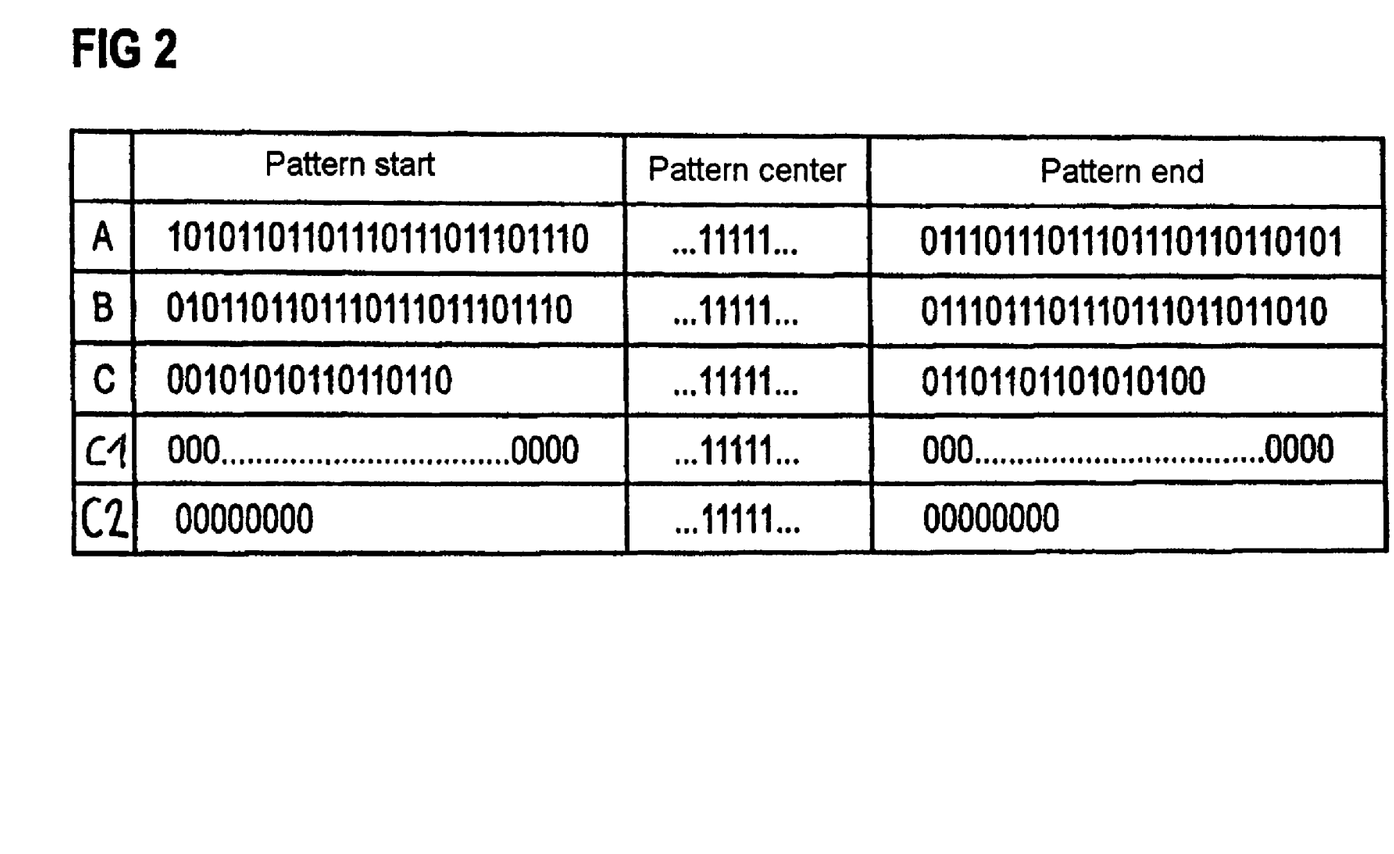
FIG. 2 shows an illustration of various exemplary embodiments of a puncturing pattern which can be used by a unit, as shown in FIG. 1, for adaptation of the data rate.

FIG. 2 shows various options for puncturing patterns according to the present invention, with the individual puncturing patterns A-C in each case being subdivided into a pattern start section (which is applicable to the start of a data block), a pattern center section (which is applicable to the central region of the data block) and a pattern end section (which is applicable to the end of the data block), and with each digit representing a coded bit. A "1" represents a bit to be transmitted and a "0" represents a bit which is to be removed or to be punctured from the respective data block. The individual patterns may, in each case, be in algorithmic form and have the common feature that no bits are ever punctured by the pattern center section since it includes only "1" bits. The pattern start and pattern end sections, in contrast, are each configured such that the puncturing rate increases continuously, and the intervals between the punctured bits become ever shorter, from the center section toward the edge. Furthermore, the individual patterns A-C are each configured such that the pattern end section is designed such that it is mirror-image symmetrical with respect to the pattern start section. Alternatively, different patterns also may be used for the pattern start section and the pattern end section. It is likewise feasible, furthermore, to carry out the puncturing only at one end; that is to say, either at the start or at the end of the respective block.

Puncturing at only one end offers advantages, particularly in the case of so-called blind rate detection. In this case, the receiver end does not know in advance exactly how many bits will be transmitted, only a set of possible lengths; for example, 40, 80 or 120 bits, is known. The receiver initiates a decoding process for each of these options. In order to determine the length actually used, the data contains a check sum, on the basis of which a decision is made at the receiving end on the length that is being used. A Viterbi algorithm or some similar algorithm also may be used for decoding of the convolutional codes. A detection method such as this also can be used for puncturing at both ends. To do this, a so-called forward recursion is carried out a number of times over the length of the puncturing pattern, for the region of the puncturing pattern at the end of the data. Since forward recursion is the part of the Viterbi algorithm involving the most computation effort, no puncturing is carried out at the end of the data in one embodiment of the present invention.

As can be seen from FIG. 2, bit numbers 2, 4, 7, 10, 14, 18, 22 and 26 are, in each case, punctured at both ends of the data block by the pattern A—(seen from the two ends or edges of the data block to be punctured). In the case of pattern B, in contrast, bit numbers 1, 3, 6, 9, 13, 17, 21 and 25 of the respective data block are punctured while, in the case of pattern C, bit numbers 1, 2, 4, 6, 8, 11, 14 and 17 are punctured.

The puncturing pattern C1 is configured such that the pattern start and the pattern end have only zeros while, in contrast, the puncturing pattern C2 is configured such that the pattern start and the pattern end each have 8 zeros. Puncturing patterns with a lower puncturing rate also may be used. If a further, conventional puncturing process with a uniform puncturing pattern, that is to say with an equidistant or approximately equidistant interval between the individual punctured bits, is used after the puncturing process, this, however, increases the probability of the gain achieved by the present invention being reduced or cancelled out. The use of puncturing patterns with a puncturing rate which is similar to the illustrated patterns A-C is thus advantageous.

As has already been mentioned, the puncturing process according to the present invention can be combined with a further puncturing process or a repetition process, in order to obtain the desired data rate in the end. This object is achieved by the unit 6b shown in FIG. 1, which for this purpose preferably uses a regular or approximately regular puncturing or repetition pattern.

It also may be disadvantageous if the puncturing which is carried out at the end of a data block is followed by a repetition of a relatively large number of bits. All the bits in the respective data block with the exception of the bits annotated "0" in the puncturing pattern to be used may be duplicated as a remedy, with the puncturing of the bits processed in this way then being carried out using an appropriate puncturing pattern instead of the original repetition process. This then results in the desired number of bits and the desired data rate. Instead of duplication, bits can be copied in a general way, with the bits which are annotated "0" not being copied, or being copied with a lower factor.

It is generally disadvantageous for repetition to follow a puncturing process. A particularly disadvantageous situation occurs if the number of bits after the coding process corresponds exactly to the number of bits to be transmitted. If edge puncturing is simply used in this case, then (for example, in the situation where 8 bits at each end are punctured by the edge puncturing process) 8 bits are punctured at both ends, and are then repeated in the conventional rate matching step 16 for the remaining bits. Simulations have shown that, at least in some scenarios, this is worse than carrying out neither puncturing nor repetition.

In addition to the method described in the preceding exemplary embodiment, the following exemplary embodiment also may be used in order to avoid this disadvantage:

The edge puncturing is not carried out immediately after the convolutional coder, but only in an integrated manner during the rate matching process. In the following example, it is assumed that k bits are intended to be punctured at both edges.

If the number of bits to be punctured is greater than 2k, then, as already described, 2k bits are first of all punctured at the edge, after which the remaining bits are punctured at a uniform interval (as far as possible) using the standard algorithm.

If the number of bits to be punctured deltaN is between 1 and 2k, then only deltaN bits are punctured at the start and end. In this case, deltaN/2 bits are expediently punctured, in each case, at the start and at the end of the block. If deltaN is odd, the number is either rounded down at the start or is rounded up at the end, or vice versa. This avoids the need to repeat 2k-deltaN bits once again in the subsequent rate matching process step after puncturing 2k bits at the ends. In this case, neither further puncturing nor repetition is required then or in the edge puncturing. If bits are repeated, then no end puncturing whatsoever is carried out.

The following method may be used as a further variant of this exemplary embodiment.

This variant subdivides the coded bits into three regions: start (of length k in the example), center and end (once again of length k). The rate matching process is then carried out as follows.

If the number of bits to be punctured deltaN is between 1 and 2k, then deltaN/2 bits are, in each case, punctured at the start and at the end, as in the exemplary embodiment just described above.

If the number of bits to be punctured is greater than 2k, then k bits are, in each case, punctured at the start and at the end, and the rest of the puncturing process is carried out in the region of the center; that is to say, in the region of the N–2k bits.

If deltaN bits have to be repeated, then k bits are, in each case, not processed at the start and at the end, and they are neither punctured nor repeated, with the entire repetition process being carried out in the region of the center; that is to say, in the region of the N−2k bits.

The advantage of this method is that both the puncturing and the repetition can be carried out in the same region of the central N−2k bits. This allows the algorithm to be standardized. Furthermore, during the repetition process, the bits at the end are not repeated, which is advantageous since these bits carry less information.

Seen overall, in this exemplary embodiment, the edge bits are preferably punctured during the puncturing process and are not repeated during the repetition process; that is to say (except for the situation where neither repetition nor puncturing is intended to be carried out), they are transmitted with a lower weighting than those bits which are not located at the edge.

This method also can be used efficiently in the situation in which the rate matching process is carried out after a first interleaver. This is the situation, for example, in the uplink UMTS system; that is to say, for transmission from the mobile station to the base station. In this case, the coded radio frames are not subdivided between the various radio frames until after the coding process, with the number of these frames being annotated F. This is done by writing the bit to a matrix with F columns, with the columns then optionally being interchanged. After this, the bits are read column-by-column. In the process, it is preferable (possibly via padding carried out prior to this) to ensure that the number of bits is divisible by F.

Provided the maximum number of bits k to be punctured at each edge is divisible by F, k/F bits at both ends of each radio frame are available for edge puncturing, which can be punctured using the same method as that already described, or else separately for each radio frame. Particularly in the situation where between 0 and 2*k/F bits are intended to be punctured in each radio frame, only a portion of the maximum number of bits in each radio frame is punctured. If the number of bits to be punctured is odd, one bit less is punctured either at the start or at the end. One bit less is, in this case, expediently punctured alternately at the start or end, or at least not always at the start or always at the end.

If the maximum number of bits k to be punctured at each edge is not divisible by F, but 2k is divisible by F, a total of 2k/F bits are available for edge puncturing in each radio frame. The puncturing process can, in this case, be carried out analogously to the methods mentioned above. However, it must be remembered in this case that, in some radio frames, the number of bits to be punctured at the start and at the end may be different. If an odd number of edge puncturing operations are intended to be carried out in cases such as this, then it is expedient to puncture one bit more at that end at which more bits are available.

Figure 5:
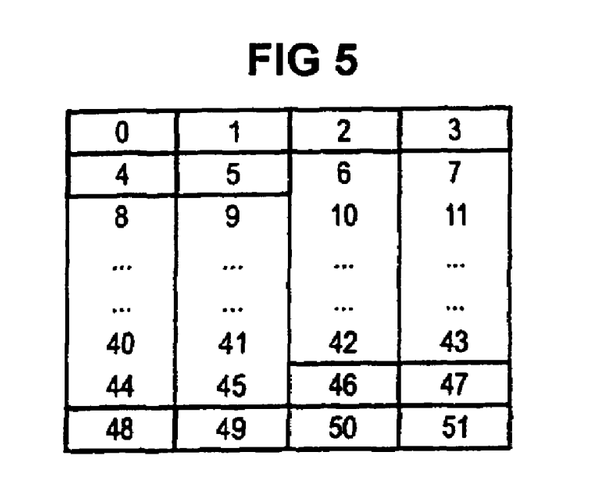
FIG. 5 shows an exemplary embodiment of the present invention, in which the edge puncturing is carried out after a first interleaver.

FIG. 5 shows an example of a puncturing process based on the above method. In this case, it is assumed that the maximum number of bits to be punctured at the start and at the end is k=6, and that the number of radio frames is F=4. In order to simplify the illustration, column interchanging is not assumed. FIG. 5, the bits which potentially can be punctured during the edge puncturing process are represented by a boundary, these being the first 6 bits (bits 0,1,2,3,4,5) and the last 6 bits (bits 46,47,48,49,50,51). It is also assumed that a total of 4 bits are punctured. In this case, the bits (bits 1,2,50,51) annotated by bold text are punctured.

As a further exemplary embodiment, the next smaller value of k which is divisible by F also may be used instead of this, in the situation where k is not divisible by F. k=4 would thus be chosen in the example of k=6 and F=4.

Figure 3A:
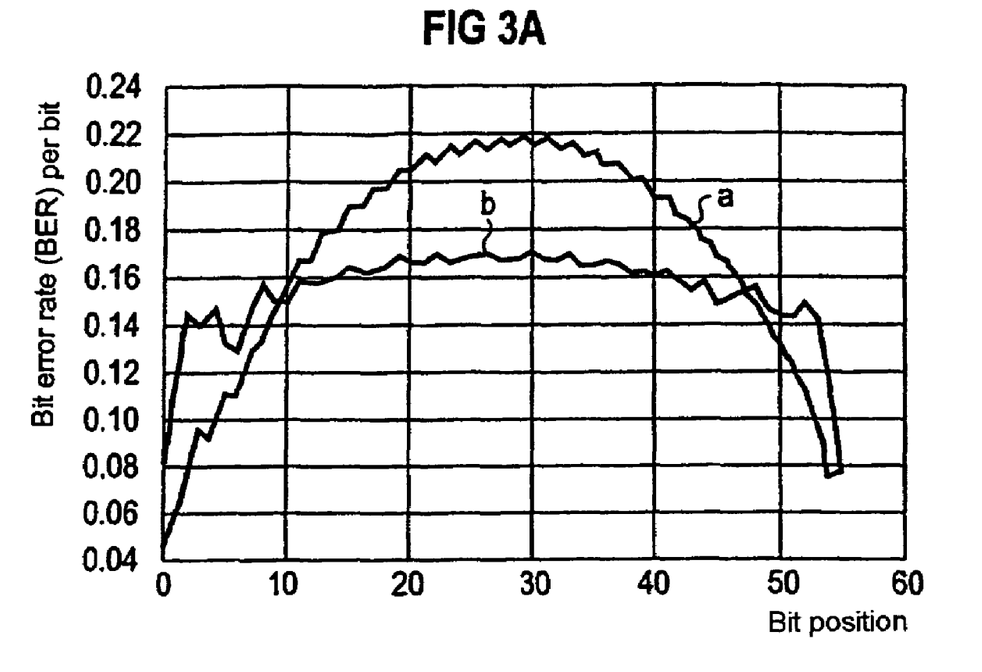
FIG. 3A shows a comparison of the results which can be achieved in terms of the bit error probability distributed over a punctured data block, using a puncturing process according to the present invention and using conventional puncturing.

By way of example, FIG. 3A shows the profile of the bit error rate for the individual transmitted bits in a data block as a function of their position or location in the data block for conventional puncturing using a regular puncturing rate of 20% (curve a) and for puncturing according to the present invention using the above pattern C, in which only eight bits at the start and at the end of the data block are punctured using a puncturing rate which, in each case, increases toward the data block edge, in conjunction with subsequent regular puncturing using a puncturing rate of 10% (curve b). It can be seen from FIG. 3A that the use of the puncturing pattern according to the present invention, via which, in particular, the tail bits of the data block to be transmitted are punctured, makes it possible to achieve a more uniform bit error rate profile over the entire data block. Since puncturing is carried out most frequently in the central region of the data block than with the conventional procedure, a lower error probability can be obtained there.

Figure 3B:
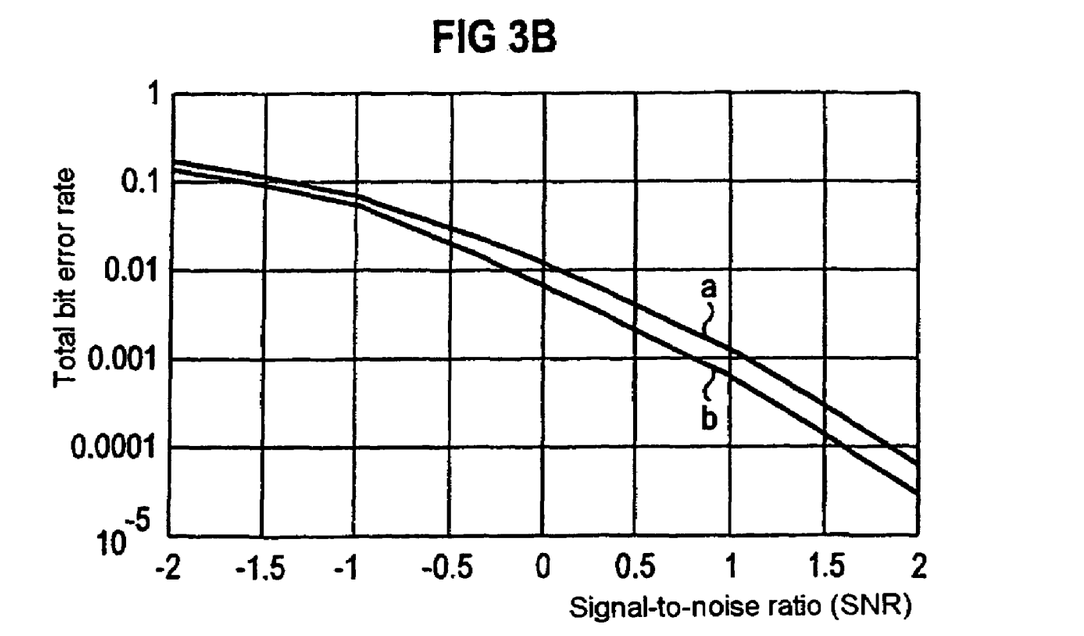
FIG. 3B shows a comparison of the results which can be achieved for the overall error probability resulting from this, using a puncturing process according to the present invention and using conventional puncturing.

For the same situation, FIG. 3B shows the profile of the overall error rate plotted against the signal-to-noise ratio (SNR). It can be seen from FIG. 3B that the present invention (curve b) makes it possible to achieve a bit error rate which is approximately 0.25 dB better than with the conventional procedure (curve a).

The present invention has been described above with reference to use in a mobile radio transmitter. However, the present invention also may, of course, be extended to mobile radio receivers where a signal which is punctured or repeated for adaptation of the data rate in the manner described above must be processed in accordance with the respectively used puncturing or repetition pattern. In this case, additional bits are inserted into the received bit stream, or two or more bits in the received bit stream are combined, in the respective receiver, for bits which have been punctured or repeated at the transmission end. When additional bits are inserted, so-called soft decision information is at the same time used as a note relating to them to the effect that their information content is highly unreliable. The received signal can be processed in the respective receiver in the same sense, but in the opposite sequence, as that in FIG. 1.

Figure 4:
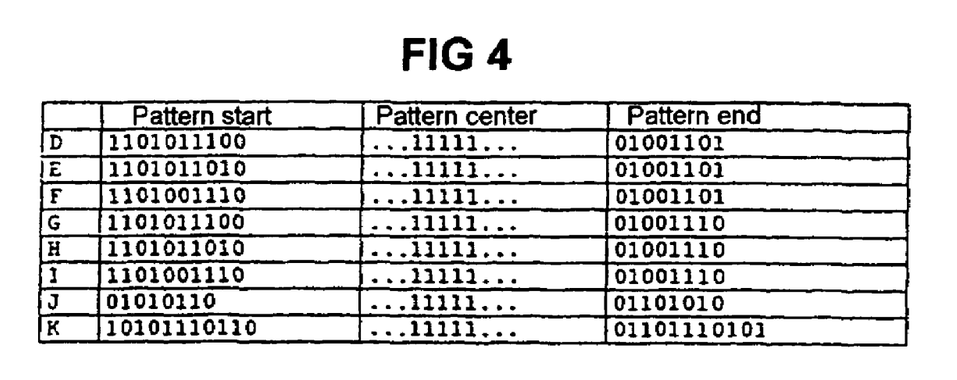
FIG. 4 shows an illustration of various exemplary embodiments of a puncturing pattern which can be used by a unit, as shown in FIG. 1, for adaptation of the data rate.

The patterns A to C explained above have been found to be particularly advantageous during complex simulations, especially in combination with coders with the rate 1/3. The patterns D to K, which are shown in FIG. 4, have been found to be particularly advantageous, during complex simulations, for coders with a rate 1/2. These patterns D to K may be used analogously to the use of the patterns A to C as explained above, and to corresponding developments. As has already been stated above, the higher code rate results in fewer coded tail bits being transmitted than for the 1/3 rate. For this reason, suitable puncturing patterns for the 1/2 rate have fewer bits than puncturing patterns for the 1/3 rate.

As can be seen from FIG. 4, the pattern D results in the bit numbers 3, 5, 8 and 9 in each case being punctured, seen from the front end of the data block to be punctured, and the bit numbers 2, 5, 6 and 8 in each case being punctured, seen from the rear end of the data block to be punctured.

From the rear end, the puncturing pattern used for the patterns E and F is the same as that for the pattern D.

The bit numbers 3, 5, 9 and 10 are, in each case, punctured by the pattern E, seen from the front end of the data block to be punctured.

The bit numbers 3, 5, 6 and 10 are, in each case, punctured by the pattern F, seen from the front end of the data block to be punctured.

The patterns G to I use the same puncturing patterns at the front end as the patterns D to F, but the bit numbers 3, 5, 9 and 10 are in each case punctured, seen from the rear end of the data block to be punctured.

The bit numbers 1, 3, 5 and 8 at both ends of the data block are, in each case, punctured by the pattern J, seen from both ends or edges of the data block to be punctured. In contrast, the bit numbers 2, 4, 8 and 11 of the respective data block are punctured when using the pattern K, seen from both ends or edges of the data block to be punctured. For data blocks with a very small number of bits, for example only 3 transmitted bits, there is no distribution of the bit error rate (BER) as a function of the position of the bit, as explained above, since all 3 bits are at the "edge", where they are better protected against errors. There are, so to speak, no bits which are located in the "center". For short blocks such as these, there are also transmitted bits which have the fixed value 0, that is to say which carry no information, when conventional coding is used—(owing to the construction principle of the convolutional codes). One embodiment variant of the present invention now provides for the patterns to be chosen such that, in short blocks such as these, these bits without any information content are preferably punctured. In this case, the same pattern is used not only for these very short blocks but also for longer blocks, thus making it easier to use a standard implementation for all block sizes.

Another refinement of the present invention provides for the Hamming distance to be optimized, or for a weighting distribution to be optimized in a general form, for very short blocks. In the case of long codes, the weighting distribution depends primarily on the polynomens which are used, while in the case of short codes, suitable puncturing patterns can be used to produce a code with a good weighting distribution.

In conjunction with a UMTS, the data may be distributed over 1, 2, 4 or 8 frames of length 10 ms in the uplink. If, however, the number of bits is not divisible by 1, 2, 4 or 8 after the coding process, an appropriate number of dummy bits are inserted in embodiment variants which can be combined with the refinements explained above, in order to allow the bits to be distributed uniformly between the frames. Instead of the insertion of dummy bits, a further advantageous refinement provides for the end puncturing pattern to be shortened in an appropriate manner. This allows additional bits to be used for transmission, while at the same time producing a number of bits which is divisible by the number of frames. In contrast to the dummy bits, the unpunctured bits carry information, and thus contribute to improving the transmission.

The puncturing pattern is, thus, shortened in such a manner that the length of the data block after the puncturing process is such that the subsequent data processing can be carried out efficiently.

This can be achieved, in particular, by the puncturing pattern being shortened such that the length of the data block after the puncturing process is divisible by the number of frames over which the data block is distributed (interleaved).

A combination of the above-mentioned criteria for selection of a puncturing pattern is also possible, of course. For example, when using the patterns D to I with the 1/2 code rate for 3 bits proposed at the moment for UMTS, all the bits without any information content are punctured, and a code with an optimum weighting distribution is produced from the remaining 14 transmitted bits. In the case of two transmitted bits, as well, the pattern D results in all the bits without any information content being punctured. If there is only one transmitted bit, 4 of a total of 6 bits without any information content are still punctured. At the same time, these patterns also provide good characteristics for longer block sizes (for example 32 bits).

Indeed, although the present invention has been described with reference to specific embodiments, those of skill in the art will recognize that changes may be made thereto without departing from the spirit and scope of the present invention as set forth in the hereafter appended claims.

The invention claimed is:

1. A method for adapting a data rate for transmission in a communications apparatus, the method comprising the steps of:
   establishing a puncturing pattern having a continuously increasing puncturing rate from a central region of a data block of a data stream toward at least one end of the data block; and
   puncturing the data block of the data stream in accordance with the puncturing pattern in order to adapt the data rate, wherein the puncturing process removes bits which correspond to the puncturing pattern from the data block.

2. A method for adapting a data rate for transmission in a communications apparatus as claimed in claim 1, wherein the puncturing rate of the puncturing pattern is 0% in the central region of the data block.

3. A method for adapting a data rate for transmission in a communications apparatus as claimed in claim 1, wherein the puncturing pattern has a continuously increasing puncturing rate from the central region of the data block toward both ends of the data block.

4. A method for adapting a data rate for transmission in a communications apparatus as claimed in claim 1, wherein the puncturing pattern has a first pattern section for a start region of the data block, a second pattern section for the central region of the data block, and a third pattern section for the at least one end region of the data block, with the puncturing pattern being designed such that the puncturing of the first pattern section is mirror-image symmetrical with respect to the puncturing of the third pattern section.

5. A method for adapting a data rate for transmission in a communications apparatus as claimed in claim 1, the method further comprising the step of puncturing a plurality of successive data blocks in the data stream using the same puncturing pattern.

6. A method for adapting a data rate for transmission in a communications apparatus as claimed in claim 1, the method further comprising the step of adapting the puncturing pattern as a function of a length of the data block to be punctured.

7. A method for adapting a data rate for transmission in a communications apparatus as claimed in claim 6, wherein the puncturing pattern is shortened for a data block having a length which is less than a predetermined limit value.

8. A method for adapting a data rate for transmission in a communications apparatus as claimed in claim 1, wherein bit numbers 2, 4, 7, 10, 14, 18, 22 and 26 of the data block are removed by the puncturing process, considered from the corresponding end of the data block to be punctured.

9. A method for adapting a data rate for transmission in a communications apparatus as claimed in claim 1, wherein bit numbers 1, 3, 6, 9, 13, 17, 21 and 25 of the data block are removed by the puncturing process, considered from the corresponding end of the data block to be punctured.

10. A method for adapting a data rate for transmission in a communications apparatus as claimed in claim 1, wherein bit numbers 1, 2, 4, 6, 8, 11, 14 and 17 of the data block are removed by the puncturing process, considered from the corresponding end of the data block to be punctured.

11. A method for adapting a data rate for transmission in a communications apparatus as claimed in claim 1, wherein bit numbers 3, 5, 8 and 9 of the data block are removed by the puncturing process, considered from a front end of the data block to be punctured, and the bit numbers 2, 5, 6 and 8 of the data block are removed by the puncturing process, considered from a rear end of the data block to be punctured.

12. A method for adapting a data rate for transmission in a communications apparatus as claimed in claim 1, wherein the data block to be punctured includes data coded using a convolutional code, with the convolutional code having a code rate 1/n and a constraint length K, and wherein a total of less than n*(K−1) bits are removed by the puncturing process from at least one of a start region and an end region of the data block in which tail bits are inserted during the coding process using the convolutional code.

13. A method for adapting a data rate for transmission in a communications apparatus as claimed in claim 12, wherein less than n*(K−1)/2 bits are respectively removed by the puncturing process from a start region and an end region of the data block.

14. A method for adapting a data rate for transmission in a communications apparatus as claimed in claim 12, further comprising, after the puncturing of the data block, at least one of a further puncturing process via which bits are again removed in accordance with a further puncturing pattern from the already punctured data block, and a repetition process via which bits are duplicated in the already punctured data block in accordance with a specific repetition pattern.

15. A method for adapting a data rate for transmission in a communications apparatus as claimed in claim 14, wherein the further puncturing pattern for the further puncturing process and the repetition pattern for the repetition process respectively correspond to substantially regular puncturing and repetition of the already punctured data block.

16. A method for adapting a data rate for transmission in a communications apparatus as claimed in claim 12, the method further comprising the steps of:
copying the bits of the data block before the puncturing process, with specific bits in the data block which are selected in accordance with the puncturing pattern being copied at a lower rate than the other bits in the data block; and
puncturing a bit stream of the data block which results from the copying process using a puncturing rate which results in a desired repetition rate.

17. A method for adapting a data rate for transmission in a communications apparatus as claimed in claim 12, wherein a pattern start and a pattern end of the puncturing pattern have only zeros.

18. A method for adapting a data rate for transmission in a communications apparatus as claimed in claim 12, wherein a pattern start and a pattern end of the puncturing pattern each have 8 zeros.

19. A method for adapting a data rate for transmission in a communications apparatus as claimed in claim 12, wherein a pattern start and a pattern end of the puncturing pattern each have 9 zeros.

20. A method for adapting a data rate for transmission in a communications apparatus as claimed in claim 12, wherein a pattern start and a pattern end of the puncturing pattern each have a multiple of n zeros when the convolution encoder has a rate of 1/n.

21. A method for adapting a data rate for transmission in a communications apparatus as claimed in claim 12, wherein a pattern start and a pattern end of the puncturing pattern each have 6 or 9 zeros when the convolutional encoder has a rate of 1/3.

22. A method for adapting a data rate for transmission in a communications apparatus as claimed in claim 12, wherein a pattern start and a pattern end of the puncturing pattern each have 4 or 6 zeros when the convolution encoder has a rate of 1/2.

23. A method for adapting a data rate for transmission in a communications apparatus as claimed in claim 12, wherein a pattern start and a pattern end of the puncturing pattern each have 6 zeros in a system in which the convolution encoder has a rate of 1/2 and a rate of 1/3 for the two coding processes.

24. A method for adapting a data rate for transmission in a communications apparatus as claimed in claim 12, wherein the data block is one of a first and a last data block of a plurality of data blocks which are produced from the segmentation of a larger data block, with only a start of the first data block and an end of the last data block, respectively, being punctured.

25. A method for adapting a data rate for transmission in a communications apparatus as claimed in claim 12, wherein the method is used only when the data blocks are not segmented into a plurality of blocks, for coding.

26. A method for adapting a data rate for transmission in a communications apparatus as claimed in claim 12, wherein a number of the bits to be punctured at the ends is reduced if a predetermined total number of remaining bits would otherwise be undershot.

27. A method for adapting a data rate for transmission in a communications apparatus as claimed in claim 12, wherein min (deltaN/2,k) bits are respectively punctured at each end of the data block, where deltaN represents the number of bits to be punctured and k represents a maximum number of bits to be punctured at one end.

28. A method for adapting a data rate for transmission in a communications apparatus as claimed in claim 27, wherein, if the number of bits to be punctured deltaN is greater than 2k, 2k bits are first punctured at both ends of the data block, after which deltaN-2k bits are punctured in accordance with a further puncturing pattern.

29. A method for adapting a data rate for transmission in a communications apparatus as claimed in claim 27, wherein, if the number of bits to be punctured deltaN is between 1 and 2k−1, deltaN/2 bits are respectively punctured at each end of the data block, with deltaN/2 being rounded up at one end and rounded down at the other end if deltaN is odd.

30. A method for adapting a data rate for transmission in a communications apparatus as claimed in claim 27, wherein, if repetition is intended to be carried out overall, the first and the last k bits of the repetition are removed, and the repetition is applied only to the remaining bits in the center.

31. A method for adapting a data rate for transmission in a communications apparatus as claimed in claim 12, the method further comprising the steps of subdividing the coded bits into start, center and end regions, with the start and end regions having respective lengths k, and with the rate adaptation carried out in accordance with a following rule: if bits are intended to be repeated, then only bits in the central region are repeated, but no bits in the start region and end region; if the number of bits to be punctured deltaN is between 1 and 2k, then deltaN/2 bits are respectively punctured at the start and end regions; and if the number of bits to be punctured is greater than 2k, then k bits are respectively punctured at the start and end regions, and the rest of the puncturing process is carried out in the center region of the N−2k bits.

32. A method for adapting a data rate for transmission in a communications apparatus as claimed in claim 1, wherein the puncturing is carried out separately for each radio frame after a first interleaver, which distributes the bits between F radio frames.

33. A method for adapting a data rate for transmission in a communications apparatus as claimed in claim 32, wherein, where the number of bits to be punctured in each radio frame is odd, an additional bit is in some cases punctured at one of a start region and an end region of the data block.

34. A method for adapting a data rate for transmission in a communications apparatus as claimed in claim 33, wherein a maximum number of bits k to be punctured at the ends is chosen as a function of the number of radio frames F such that k is divisible by F.

35. A transmission communications apparatus, comprising a puncturing device for puncturing a data block in a data stream which is supplied to the puncturing device, the puncturing process using a puncturing pattern which has a continuously increasing puncturing rate from a central region of the data block toward at least one end of the data block, with the puncturing device removing bits which correspond to the puncturing pattern from the data block via the puncturing process.

36. A transmission communications apparatus as claimed in claim 35, wherein the communication apparatus is a UMTS mobile radio transmitting apparatus.

* * * * *